(12) United States Patent
Grantz

(10) Patent No.: US 6,508,409 B1
(45) Date of Patent: Jan. 21, 2003

(54) HEAT PRODUCING SYSTEM FOR A BUILDING

(76) Inventor: Robert Grantz, 43416 Olive Ave., Hemet, CA (US) 92544

( * ) Notice: Subject to any disclaimer, the term of this patent is extended or adjusted under 35 U.S.C. 154(b) by 0 days.

(21) Appl. No.: 09/961,737

(22) Filed: Sep. 24, 2001

(51) Int. Cl.$^7$ ............................................. F24D 19/06
(52) U.S. Cl. ............................. 237/81; 237/50; 165/45
(58) Field of Search ..................... 237/81, 1 R, 50; 165/45, 163

(56) References Cited

U.S. PATENT DOCUMENTS

| | | | | |
|---|---|---|---|---|
| 5,206,173 A | * | 4/1993 | Finn | 435/290.1 |
| 5,707,416 A | * | 1/1998 | Sudrabin | 165/45 |
| 6,010,551 A | * | 1/2000 | Jonninen | 210/620 |

* cited by examiner

Primary Examiner—Derek Boles
(74) Attorney, Agent, or Firm—Goldstein & Lavas, P.C.

(57) ABSTRACT

A heat producing system for a building including a cylindrical housing having a closed upper end, a closed lower end, a cylindrical side wall therebetween, and a hollow interior. The closed upper end has an opening therethrough exposing the hollow interior. A piping system is disposed within the hollow interior of the cylindrical housing. The piping system includes a series of air inlets extending outwardly of the cylindrical housing adjacent to the closed lower end thereof. The piping system includes a single outlet pipe extending outwardly of the cylindrical housing adjacent to the closed upper end thereof. The single outlet pipe is coupled with a heating duct system of a building. A quantity of vegetable matter is positioned within the hollow interior of the cylindrical housing. The vegetable matter is positioned over the piping system whereby as the vegetable matter decomposes, heat will be generated thereby warming air within the piping system whereafter the warmed air will rise out through the single outlet pipe into the heating duct system of the building and cooler air is drawn in through the air inlets for subsequent heating.

5 Claims, 2 Drawing Sheets

HEAT PRODUCING SYSTEM FOR A BUILDING

BACKGROUND OF THE INVENTION

The present invention relates to a heat producing system for a building and more particularly pertains to utilizing decomposing vegetable matter to introduce heat into a heating duct system of a building.

The use of heating systems is known in the prior art. More specifically, heating systems heretofore devised and utilized for the purpose of providing heat to structures are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a heat producing system for a building for utilizing decomposing vegetable matter to introduce heat into a heating duct system of a building.

In this respect, the heat producing system for a building according to the present invention substantially departs from the conventional concepts and designs of the prior art, and in doing so provides an apparatus primarily developed for the purpose of utilizing decomposing vegetable matter to introduce heat into a heating duct system of a building.

Therefore, it can be appreciated that there exists a continuing need for a new and improved heat producing system for a building which can be used for utilizing decomposing vegetable matter to introduce heat into a heating duct system of a building. In this regard, the present invention substantially fulfills this need.

SUMMARY OF THE INVENTION

In the view of the foregoing disadvantages inherent in the known types of heating systems now present in the prior art, the present invention provides an improved heat producing system for a building. As such, the general purpose of the present invention, which will be described subsequently in greater detail, is to provide a new and improved heat producing system for a building which has all the advantages of the prior art and none of the disadvantages.

To attain this, the present invention essentially comprises a cylindrical housing having a closed upper end, a closed lower end, a cylindrical side wall therebetween, and a hollow interior. The cylindrical housing is constructed of fire bricks. The closed upper end has an opening therethrough exposing the hollow interior. The opening has a door removably positioned thereon. The cylindrical housing has access steps extending from the closed upper end to the closed lower end. A piping system is disposed within the hollow interior of the cylindrical housing. The piping system includes a series of air inlets extending outwardly of the cylindrical housing adjacent to the closed lower end thereof. The piping system includes a single outlet pipe extending outwardly of the cylindrical housing adjacent to the closed upper end thereof. The single outlet pipe is coupled with a heating duct system of a building. A quantity of vegetable matter is positioned within the hollow interior of the cylindrical housing. The vegetable matter is positioned over the piping system whereby as the vegetable matter decomposes, heat will be generated thereby warming air within the piping system whereafter the warmed air will rise out through the single outlet pipe into the heating duct system of the building and cooler air is drawn in through the air inlets for subsequent heating.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heat producing system for a building which has all the advantages of the prior art heating systems and none of the disadvantages.

It is another object of the present invention to provide a new and improved heat producing system for a building which may be easily and efficiently manufactured and marketed.

It is a further object of the present invention to provide a new and improved heat producing system for a building which is of durable and reliable construction.

An even further object of the present invention is to provide a new and improved heat producing system for a building which is susceptible of a low cost of manufacture with regard to both materials and labor, and which accordingly is then susceptible of low prices of sale to the consuming public, thereby making such a heat producing system for a building economically available to the buying public.

Even still another object of the present invention is to provide a new and improved heat producing system for a building for utilizing decomposing vegetable matter to introduce heat into a heating duct system of a building.

Lastly, it is an object of the present invention to provide a new and improved heat producing system for a building including a cylindrical housing having a closed upper end, a closed lower end, a cylindrical side wall therebetween, and a hollow interior. The closed upper end has an opening therethrough exposing the hollow interior. A piping system is disposed within the hollow interior of the cylindrical housing. The piping system includes a series of air inlets extending outwardly of the cylindrical housing adjacent to the closed lower end thereof. The piping system includes a single outlet pipe extending outwardly of the cylindrical housing adjacent to the closed upper end thereof. The single outlet pipe is coupled with a heating duct system of a building. A quantity of vegetable matter is positioned within the hollow interior of the cylindrical housing. The vegetable matter is positioned over the piping system whereby as the vegetable matter decomposes, heat will be generated thereby warming air within the piping system whereafter the warmed air will rise out through the single outlet pipe into the heating duct system of the building and cooler air is drawn in through the air inlets for subsequent heating.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
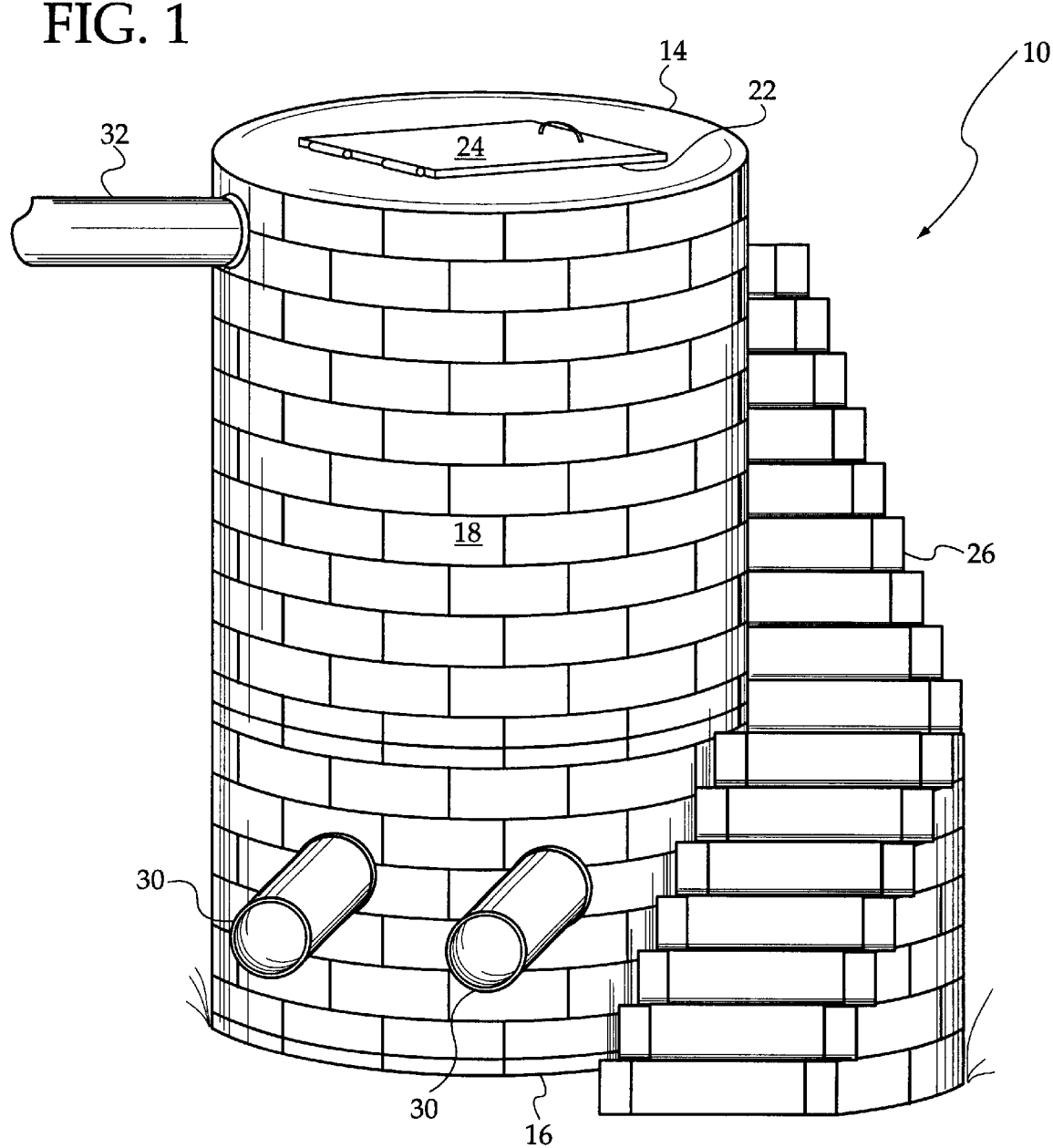
FIG. 1 is a perspective view of the preferred embodiment of the heat producing system for a building constructed in accordance with the principles of the present invention.
Figure 2:
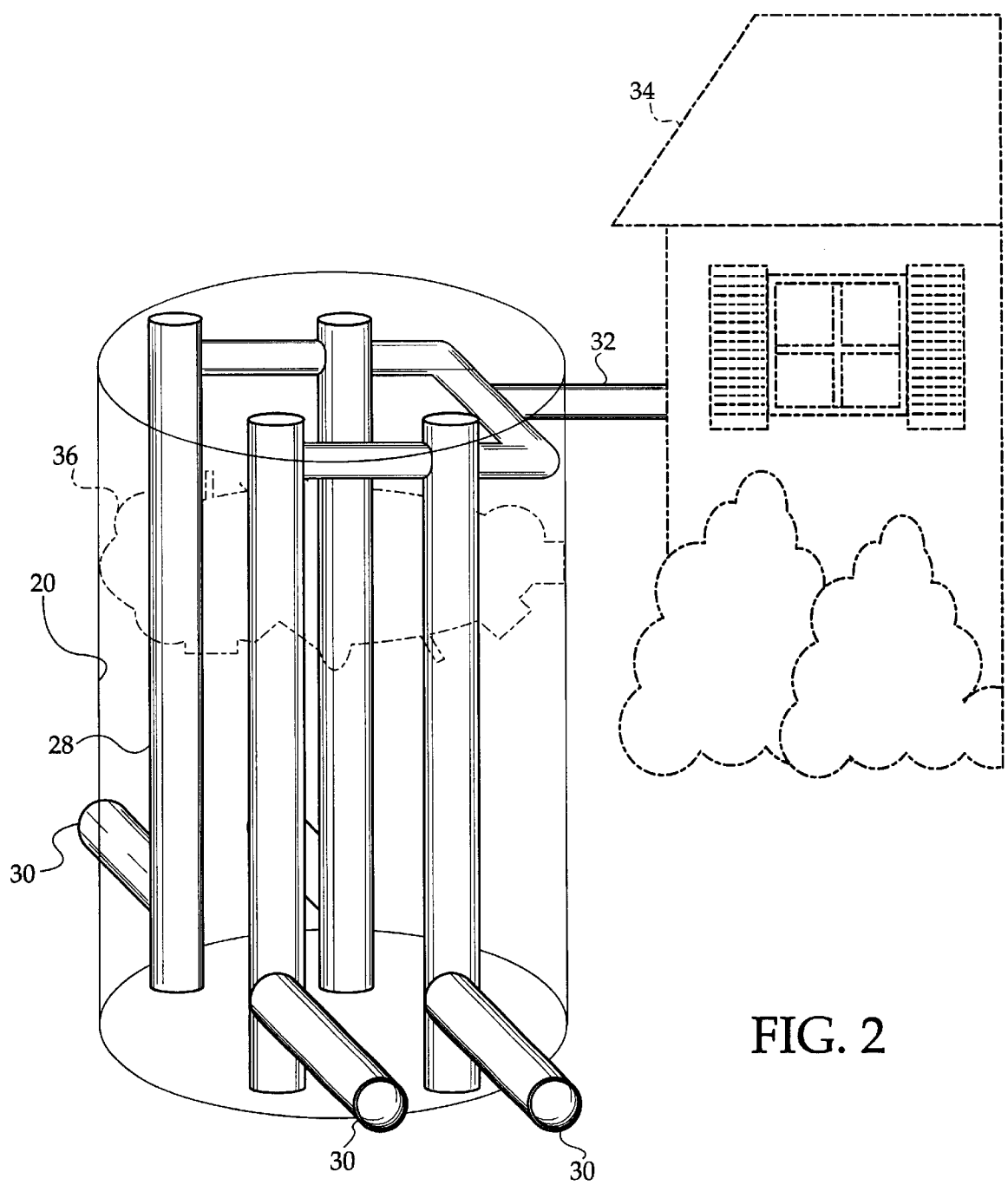
FIG. 2 is a perspective view of the present invention illustrating the piping system within the cylindrical housing.

With reference now to the drawings, and in particular, to FIGS. 1 and 2 thereof, the preferred embodiment of the new and improved heat producing system for a building embodying the principles and concepts of the present invention and generally designated by the reference number 10 will be described.

Specifically, it will be noted in the various Figures that the device relates to a heat producing system for a building for utilizing decomposing vegetable matter to introduce heat into a heating duct system of a building. In its broadest context, the device consists of a cylindrical housing, a piping system, and a quantity of vegetable matter. Such components are individually configured and correlated with respect to each other so as to attain the desired objective.

The cylindrical housing 12 has a closed upper end 14, a closed lower end 16, a cylindrical side wall 18 therebetween, and a hollow interior 20. The cylindrical housing 12 is constructed of fire bricks. The closed upper end 14 has an opening 22 therethrough exposing the hollow interior 20. The opening 22 has a door 24 removably positioned thereon. The cylindrical housing 12 has access steps 26 extending from the closed upper end 14 to the closed lower end 15.

The piping system 28 is disposed within the hollow interior 20 of the cylindrical housing 12. The piping system 28 includes a series of air inlets 30 extending outwardly of the cylindrical housing 12 adjacent to the closed lower end 16 thereof. The piping system 28 includes a single outlet pipe 32 extending outwardly of the cylindrical housing 12 adjacent to the closed upper end 14 thereof. The single outlet pipe 32 is coupled with a heating duct system of a building 34. Note FIG. 2.

The quantity of vegetable matter 36 is positioned within the hollow interior 20 of the cylindrical housing 12. The vegetable matter 36 is positioned over the piping system 28 whereby as the vegetable matter 36 decomposes, heat will be generated thereby warming air within the piping system 28 whereafter the warmed air will rise out through the single outlet pipe 32 into the heating duct system of the building 34 and cooler air is drawn in through the air inlets 30 for subsequent heating. The vegetable matter 36 is added to the hollow interior through the opening 22 after raising the access door 24. As the matter 36 decomposes, more matter 36 can be added to continually heat the building.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A heat producing system for a building for utilizing decomposing vegetable matter to introduce heat into a heating duct system of a building comprising, in combination:

a cylindrical housing having a closed upper end, a closed lower end, a cylindrical side wall therebetween, and a hollow interior, the cylindrical housing being constructed of fire bricks, the closed upper end having an opening therethrough exposing the hollow interior, the opening having a door removably positioned thereon, the cylindrical housing having access steps extending from the closed upper end to the closed lower end;

a piping system disposed within the hollow interior of the cylindrical housing, the piping system including a series of air inlets extending outwardly of the cylindrical housing adjacent to the closed lower end thereof, the piping system including a single outlet pipe extending outwardly of the cylindrical housing adjacent to the closed upper end thereof, the single outlet pipe being coupled with a heating duct system of a building; and a quantity of vegetable matter positioned within the hollow interior of the cylindrical housing, the vegetable matter being positioned over the piping system whereby as the vegetable matter decomposes, heat will be generated thereby warming air within the piping system whereafter the warmed air will rise out through the single outlet pipe into the heating duct system of the building and drawing cooler air in through the air inlets for subsequent heating.

2. A heat producing system for a building for utilizing decomposing vegetable matter to introduce heat into a heating duct system of a building comprising, in combination:

a cylindrical housing having a closed upper end, a closed lower end, a cylindrical side wall therebetween, and a hollow interior, the closed upper end having an opening therethrough exposing the hollow interior;

a piping system disposed within the hollow interior of the cylindrical housing, the piping system including a series of air inlets extending outwardly of the cylindrical housing adjacent to the closed lower end thereof, the piping system including a single outlet pipe extending outwardly of the cylindrical housing adjacent to the closed upper end thereof, the single outlet pipe being coupled with a heating duct system of a building; and a quantity of vegetable matter positioned within the hollow interior of the cylindrical housing, the vegetable matter being positioned over the piping system whereby as the vegetable matter decomposes, heat will be generated thereby warming air within the piping system whereafter the warmed air will rise out through the single outlet pipe into the heating duct system of the building and drawing cooler air in through the air inlets for subsequent heating.

3. The heat producing system for a building as set forth in claim 2, wherein the cylindrical housing is constructed of fire bricks.

4. The heat producing system for a building as set forth in claim 2, wherein the opening in the closed upper end of the cylindrical housing has a door removably positioned thereon.

5. The heat producing system for a building as set forth in claim 2, wherein the cylindrical housing has access steps extending from the closed upper end to the closed lower end.

* * * * *